US009649771B2

(12) United States Patent
Mihara et al.

(10) Patent No.: US 9,649,771 B2
(45) Date of Patent: May 16, 2017

(54) PARALLEL ROBOT, ROBOT SYSTEM, AND ASSEMBLY METHOD FOR TRANSFER SYSTEM

(71) Applicant: KABUSHIKI KAISHA YASKAWA DENKI, Kitakyushu-shi (JP)

(72) Inventors: Nobuhiko Mihara, Fukuoka (JP); Takashi Sanada, Fukuoka (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 0 days.

(21) Appl. No.: 14/287,166

(22) Filed: May 26, 2014

(65) Prior Publication Data

US 2014/0360306 A1    Dec. 11, 2014

(30) Foreign Application Priority Data

Jun. 7, 2013 (JP) ................... 2013-120739

(51) Int. Cl.
*B25J 9/00* (2006.01)
*B25J 19/00* (2006.01)

(52) U.S. Cl.
CPC .......... *B25J 19/0029* (2013.01); *B25J 9/0051* (2013.01); *B25J 9/003* (2013.01); *B25J 9/0018* (2013.01); *Y10S 901/27* (2013.01); *Y10T 74/20311* (2015.01)

(58) Field of Classification Search
CPC ...... B25J 9/0051; B25J 19/0029; B25J 9/003; B25J 9/0018; Y10S 901/27; Y10T 74/20311
See application file for complete search history.

(56) References Cited

U.S. PATENT DOCUMENTS

| | | | |
|---|---|---|---|
| 6,418,811 B1 * | 7/2002 | Rosheim | B25J 17/0266 414/729 |
| 6,543,987 B2 * | 4/2003 | Ehrat | B25J 15/0616 414/729 |
| 9,114,538 B2 * | 8/2015 | Fukudome | B25J 17/0266 |
| 2009/0269180 A1 | 10/2009 | Wappling et al. | |
| 2012/0118097 A1 * | 5/2012 | Ilch | B25J 17/0266 74/490.05 |
| 2013/0017050 A1 | 1/2013 | Fukudome et al. | |

FOREIGN PATENT DOCUMENTS

| | | |
|---|---|---|
| CN | 101772403 | 7/2010 |
| CN | 102873686 | 1/2013 |
| EP | 2548032 | 1/2013 |

(Continued)

OTHER PUBLICATIONS

Japanese Office Action for corresponding JP Application No. 2013-120739, Jun. 2, 2015.

(Continued)

*Primary Examiner* — Gerald McClain
*Assistant Examiner* — Ronald Jarrett
(74) *Attorney, Agent, or Firm* — Mori & Ward, LLP (57) ABSTRACT

A parallel robot includes a base casing, a plurality of arms, and an end unit. The base casing contains a plurality of actuators. Each of the arms is coupled to one of the actuators. The end unit is coupled to the plurality of arms. A communication hole for allowing piping and/or wiring to continue is formed in the base casing at its side facing the end unit.

19 Claims, 8 Drawing Sheets

(56) References Cited

FOREIGN PATENT DOCUMENTS

| FR | 2647763 | 12/1990 |
| FR | 2647763 B1 | 12/1990 |
| JP | 2004-223635 | 8/2004 |
| JP | 2010-247238 | 11/2010 |
| JP | 2013-022652 | 2/2013 |
| JP | 2013-039650 | 2/2013 |
| WO | WO 2011/015189 | 2/2011 |
| WO | WO 2011/027547 | 3/2011 |

OTHER PUBLICATIONS

Extended European Search Report for corresponding EP Appiication No. 14163037.6-1712, Jun. 20, 2014.
Chinese Office Action for corresponding CN Application No. 201410126396.4, Aug. 6, 2015.
European Patent Office Communication for corresponding EP Application No. 14163037.6-1712, May 25, 2016.
Chinese Office Action for corresponding CN Application No. 201410126396.4, Oct. 8, 2016.
Chinese Office Action for corresponding CN Application No. 201410126396.4, Apr. 12, 2016.
Chinese Office Action for correspoding CN Application No. 201410126396.4, Mar. 1, 2017.
European Office Action for corresponding EP Application No. 14 163 037.6-1712, Mar. 16, 2017.

\* cited by examiner

PARALLEL ROBOT, ROBOT SYSTEM, AND ASSEMBLY METHOD FOR TRANSFER SYSTEM

CROSS-REFERENCE TO RELATED APPLICATION

This application is based upon and claims the benefit of priority from Japanese Patent Application No. 2013-120739, filed Jun. 7, 2013, the entire contents of which are incorporated herein by reference.

BACKGROUND

1. Field

The present disclosure relates to a parallel robot, a robot system, and an assembly method for a transfer system.

2. Description of the Related Art

JP 2013-39650 A discloses a parallel robot that includes a base casing, a plurality of arms, and an end unit. The base casing contains a plurality of actuators. The arms are each coupled to one of the actuators. The end unit is coupled to the plurality of arms.

SUMMARY

A parallel robot according to the present disclosure includes: a base casing containing a plurality of actuators; a plurality of arms, each of the arms being coupled to one of the actuators; and an end unit coupled to the plurality of arms, wherein a communication hole for allowing at least one of piping and wiring to continue is formed in the base casing at a side thereof facing the end unit.

A robot system according to the present disclosure includes: the parallel robot; an end effector provided on the end unit of the parallel robot; and at least one of a hose and a cable for driving the end effector, wherein at least one of the hose and the cable is routed through the communication hole to the end effector.

An assembly method for a transfer system according to the present disclosure includes: installing a parallel robot, the parallel robot including: a base casing containing a plurality of actuators; a plurality of arms, each of the arms being coupled to one of the actuators; and an end unit coupled to the plurality of arms, the base casing having a communication hole for allowing at least one of piping and wiring to continue formed therein at a side thereof facing the end unit; routing at least one of the hose and the cable through the communication hole; attaching an end effector to the end unit; and coupling at least one of the hose and the cable to the end effector.

DETAILED DESCRIPTION

An embodiment will now be described in detail with reference to the drawings. Like components or components with like functions are indicated with like reference figures, and the description thereof is not duplicated.

Figure 1:
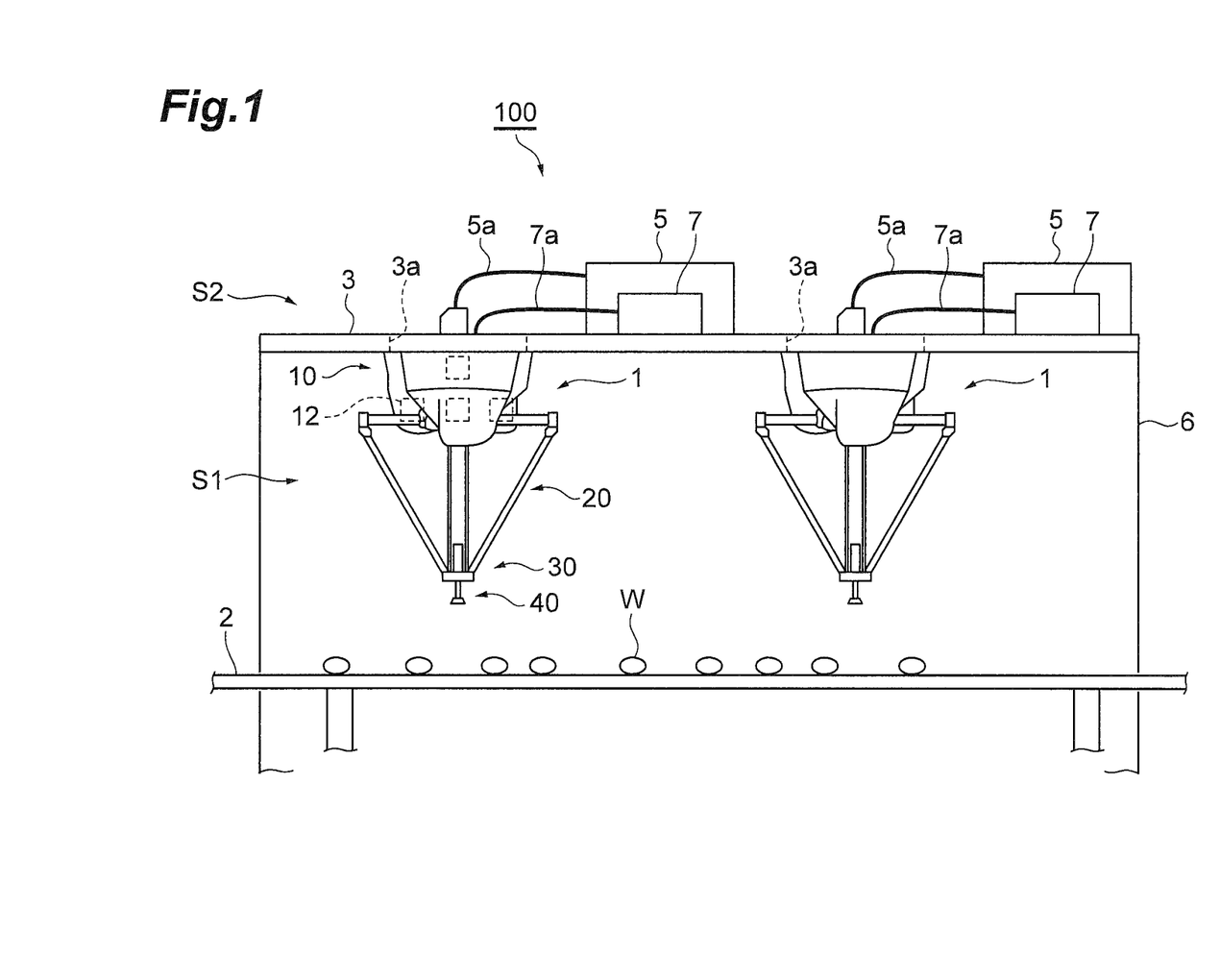
FIG. 1 is a schematic view of a transfer system including a parallel robot according to an embodiment.

A transfer system (a robot system) 100 illustrated in FIG. 1 is a picking system for performing a pick-and-place work in which a parallel robot 1 picks up a workpiece W transferred by a conveyor (a workpiece transfer device) 2 and place the workpiece at another location. The transfer system 100 includes a ceiling board 3, the conveyor 2 arranged under the ceiling board 3, two parallel robots (parallel link robots, delta robots) 1 secured to the ceiling board 3 at its lower side with bolts or the like, and two controllers 5 and two suction blowers (external devices) 7 arranged on the ceiling board 3 at its upper side. Note that the number of parallel robots 1 is not limited to two. It may be one, or it may be three or more.

The parallel robot 1 includes a robot body 10, three arms 20, an end unit 30, and an end effector 40. The robot body 10, which includes three actuators 12, is attached to the ceiling board 3 at its lower side. The three arms 20 are each coupled to one of the three actuators 12. The end unit 30 is coupled to the three arms 20. The end effector 40 is mounted on the end unit 30. The parallel robot 1 allows the end effector 40 to retain the workpiece W and enables the three arms 20 to move the end effector 40 in cooperation, so that the workpiece W is transferred.

The ceiling board 3 may be supported horizontally by a plurality of poles (not shown), or it may be suspended horizontally from a ceiling of a plant. Alternatively, the ceiling of the plant may be used as the ceiling board 3. The ceiling board 3 functions as an installation member to retain the parallel robot 1 and also functions as a division member to divide vertically the surroundings of a base casing 11 (to be described hereinafter) of the robot body 10. In other words, the transfer system 100 includes the installation member and the division member. The installation member may be configured with a frame different from the ceiling board 3. The ceiling board 3 has two openings 3a corresponding to the two parallel robots 1. The openings 3a are used for the maintenance of the parallel robots 1 and for routing piping and/or wiring to the parallel robots 1. A transparent side wall 6 is installed around the conveyor 2. The ceiling board 3 and the side wall 6 divide a work space S1 of the parallel robots 1 from an external space S2.

Each controller 5 is connected through a cable 5a to the robot body 10 to control the three actuators 12. Each suction blower 7 generates suction force for adherence to the workpiece W. The suction force is transmitted through a hose 7a to the end effector 40.

The parallel robot 1 will now be described in detail. As described in FIGS. 2 to 4, the robot body 10 includes the base casing 11 and the three actuators 12 contained in the base casing 11. The base casing 11 includes a case 11A and a lid 11B. The case 11A has a substantially circular bowl-like shape in a plan view. The case 11A has at its bottom three bulges 11a bulging downward. The three bulges 11a are arranged along a circumferential direction. The lid 11B has a plate-like shape and covers the case 11A at its top. The lid 11B is detachably attached to the case 11A with a plurality of fasteners 19.

Figure 4:
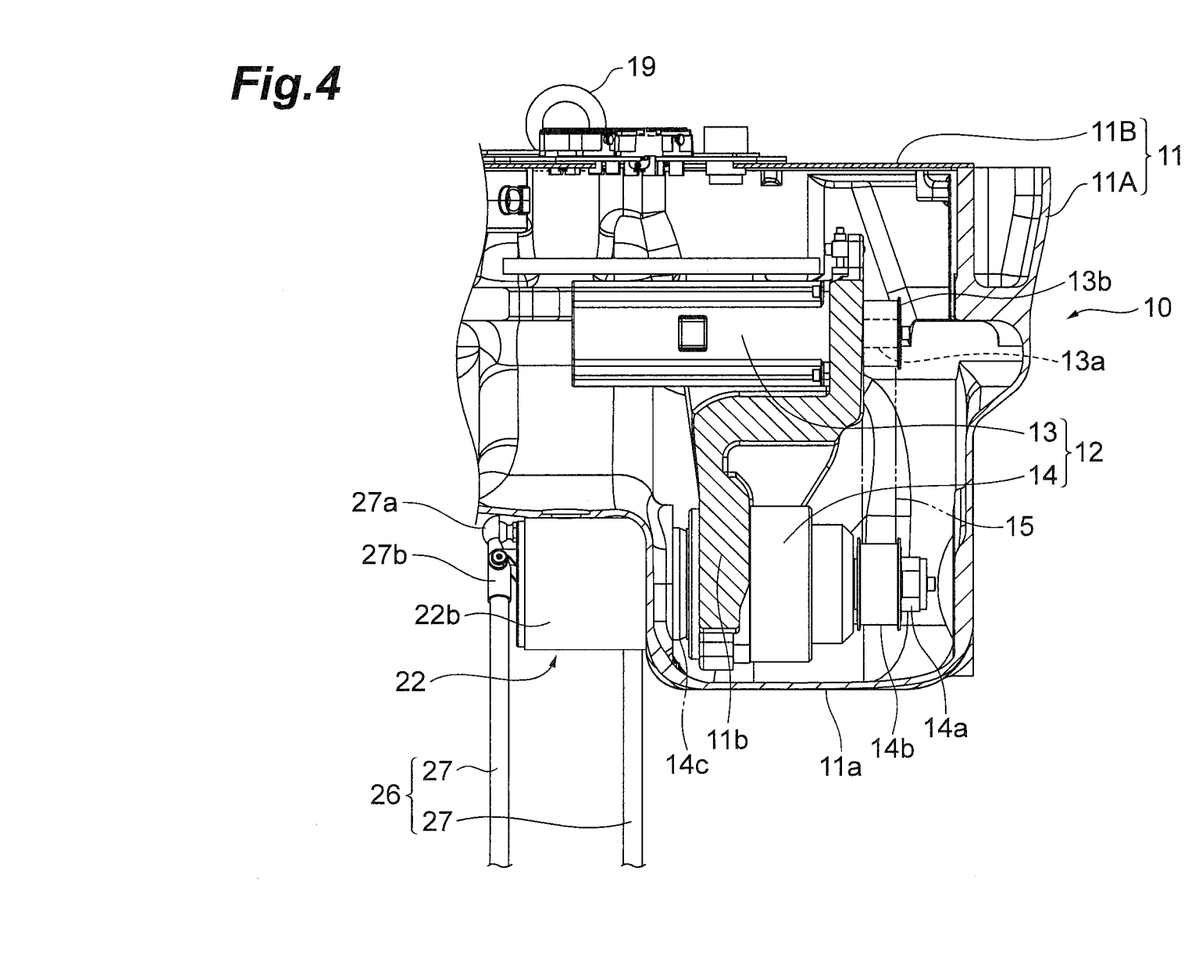
FIG. 4 is a sectional view taken along line IV-IV in FIG. 2.

The three actuators 12 are arranged in such a manner that they each correspond to one of the three bulges 11a. As illustrated in FIG. 4, each actuator 12 includes a motor 13 and a speed reducer 14. The speed reducer 14 is accommodated in each bulge 11a, and the motor 13 is arranged above the speed reducer 14. The motor 13 and the speed reducer 14 are secured to a bracket 11b provided in the case 11A.

The motor 13 includes an output shaft 13a and a pulley 13b. The output shaft 13a protrudes in the horizontal direction, and the pulley 13b is mounted on an outer periphery of the output shaft 13a. The speed reducer 14 includes an input shaft 14a, a pulley 14b, and an output shaft 14c. The input shaft 14a protrudes in a direction identical to that of the output shaft 13a, and the output shaft 14c protrudes at a side opposite to the input shaft 14a. The pulley 14b is mounted on an outer periphery of the input shaft 14a. A timing belt 15 is applied over the pulley 13b and the pulley 14b. This transmits power of the motor 13 to the input shaft 14a, allowing the output shaft 14c to output the power.

Figure 5:
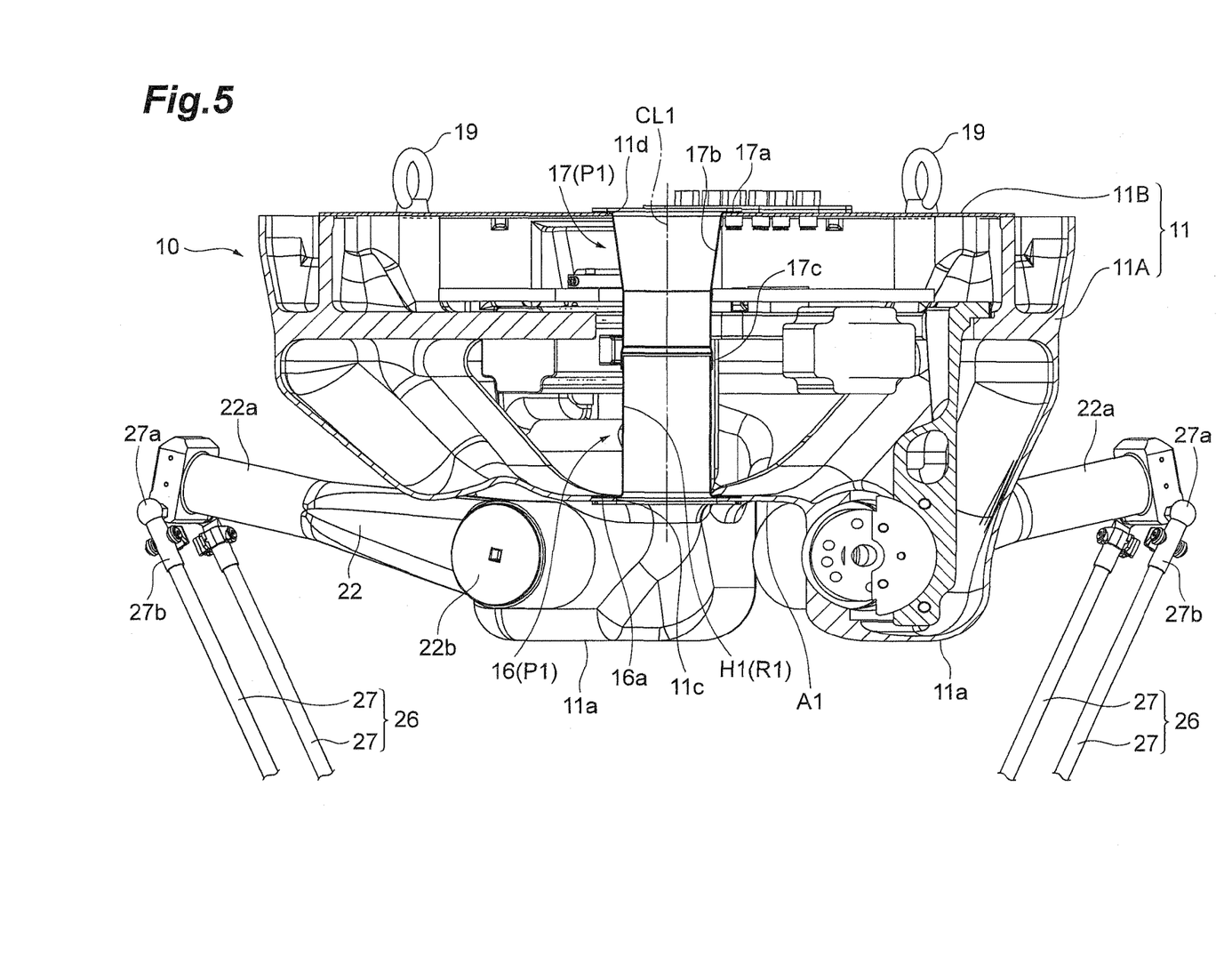
FIG. 5 is a sectional view taken along line V-V in FIG. 2.

As illustrated in FIG. 5, a first opening 11c is formed in the bottom of the case 11A in an area A1 surrounded by the bulges 11a. The opening 11c is equivalent to a communication hole for allowing at least one of the piping and the wiring to continue. As described hereinafter, the three arms 20 are coupled to the speed reducers 14 in the bulges 11a, and thus the area A1 is surrounded also by the three arms 20. A second opening 11d is formed in the lid 11B at a position corresponding to that of the opening 11c. The opening 11d is also equivalent to the communication hole for allowing at least one of the piping and the wiring to continue.

A tubular member 16 is attached around the opening 11c and protrudes upward. The tubular member 16 has a cylindrical shape and includes at its outer circumference at its lower end a flange 16a. The tubular member 16 is arranged substantially concentrically with the opening 11c. The flange 16a is on an upper surface of the bottom of the case 11A and secured to the case 11A through bolt fastening or the like.

A tubular member 17 is attached around the opening 11d and protrudes downward. The tubular member 17 has a cylindrical shape and includes at its outer circumference at its upper end a flange 17a. The tubular member 17 is gradually flared upward toward the flange 17a to have a tapered portion 17b. The tubular member 17 is arranged substantially concentrically with the opening 11d and has been passed into the opening 11d from above. The flange 17a is on an upper surface of the lid 11B and secured to the lid 11B through bolt fastening or the like.

Figure 6:
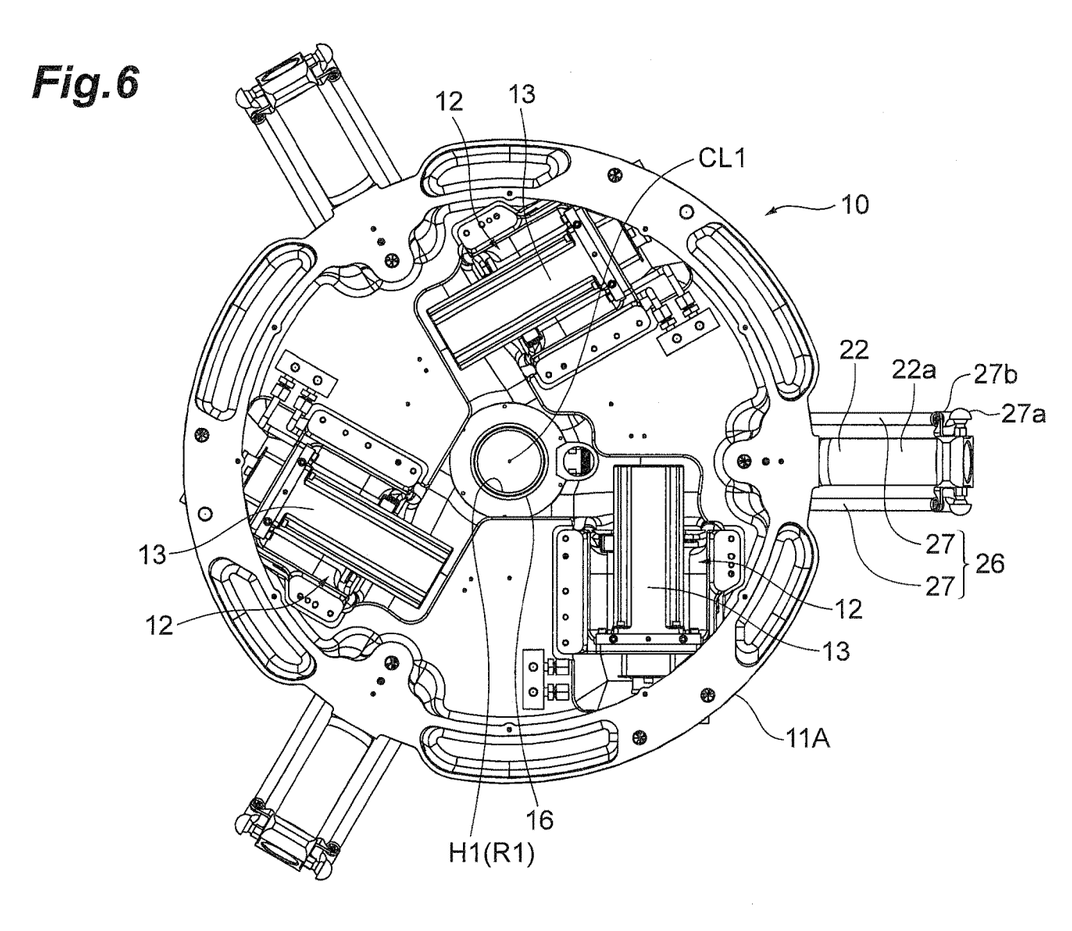
FIG. 6 is a plan view of the robot body with a lid removed.

The tubular member 17 has at its lower end a fitting portion 17c that fits an outer periphery of the tubular member 16. The fitting of the fitting portion 17c and a distal end of the tubular member 16 couples the tubular member 16 and the tubular member 17. The tubular member 16 and the tubular member 17, which are coupled with each other, constitute a tubular unit P1 that allows the lower side and the upper side of the base casing 11 to communicate with each other. The tubular unit P1 is positioned in an area surrounded by the three actuators 12 (see FIG. 6). The tubular unit P1 constitutes a communication hole H1 that allows the opening 11c and the opening 11d to communicate with each other and penetrates the base casing 11 between its lower and upper sides. The inner diameter of the communication hole H1 is determined in consideration of the size, the number, and the like of hoses and/or cables for the piping and/or the wiring to be routed.

Figure 2:
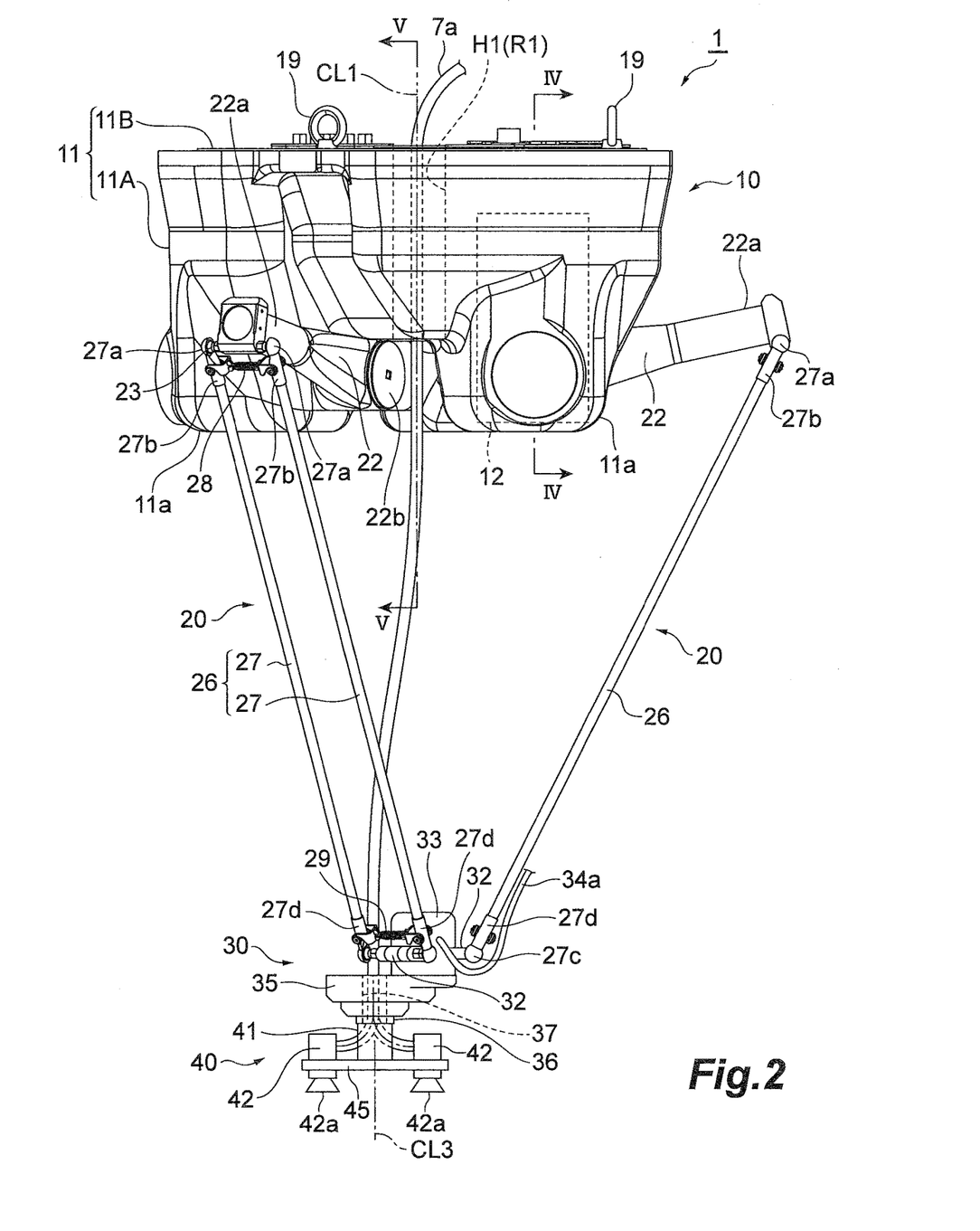
FIG. 2 is a side view of the parallel robot according to the embodiment.
Figure 3:
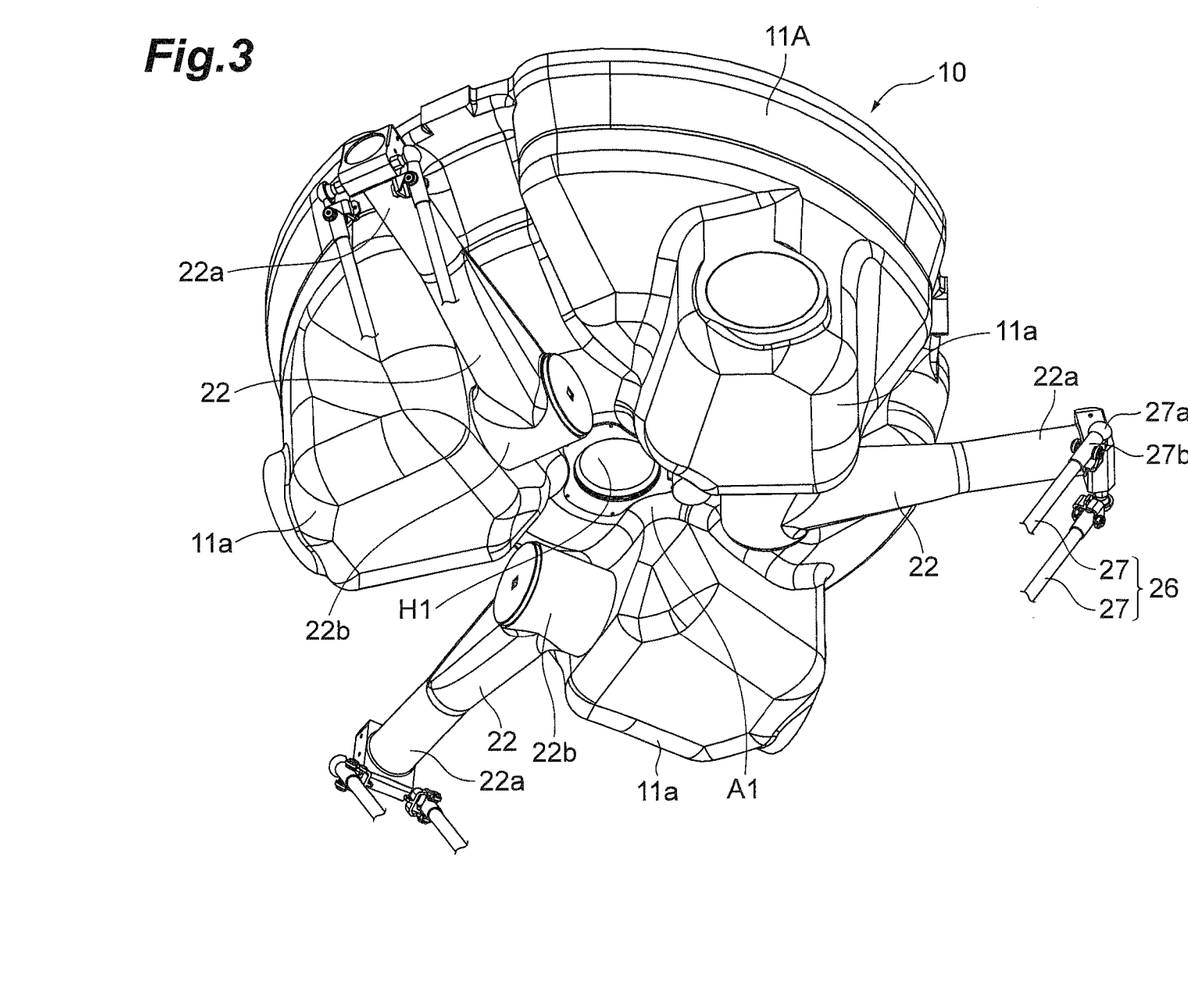
FIG. 3 is a perspective view of a robot body observed from below.

As illustrated in FIG. 2, each arm 20 includes a base linkage 22, which is equivalent to an upper arm, and a coupling linkage 26, which is equivalent to a forearm. The base linkage 22 extends outward from between two neighboring bulges 11a. The coupling linkage 26 couples a distal end 22a of the base linkage 22 with the end unit 30 and includes two rod-like members 27. An example of materials for the base linkage 22 and the coupling linkage 26 includes carbon fiber reinforced plastics (CFRP) and other lightweight material.

A proximal end 22b of the base linkage 22 is connected to the output shaft 14c of the speed reducer 14. The base linkage 22 turns by an operation of the actuator 12 to move the distal end 22a up and down. In the description hereinafter, "the base linkage 22 turns to the upper side" means that the base linkage 22 turns so as to raise the distal end 22a, and "the base linkage 22 turns to the lower side" means that the base linkage 22 turns so as to lower the distal end 22a. The distal end 22a has a pair of spherical projections 23. The pair of spherical projections 23, which are disposed side by side along a direction parallel to a turning axis line of the base linkage 22, protrude outward.

The two rod-like members 27 constituting the coupling linkage 26 extend in parallel with each other. Each rod-like member 27 includes at its upper end 27b a cup 27a. The cup 27a and a spherical projection 23 constitute together a ball joint. The upper ends 27b of the two rod-like members 27 are coupled with each other through an elastic member 28, such as a coil spring, with their cups 27a each covering one of the spherical projections 23 from the outside.

A lower end 27d of each rod-like member 27 is coupled with a coupler 32 of the end unit 30. The coupler 32 includes a pair of spherical projections 32a. The lower end 27d includes a cup 27c. The cup 27c and the spherical projection 32a constitute together a ball joint. The lower ends 27d of the two rod-like members 27 are coupled with each other through an elastic member 29, such as a coil spring, with their cups 27c each covering one of the spherical projection 32a from the outside. The ball joints render the coupling linkage 26 turnable three-dimensionally with respect to the base linkage 22 and the end unit 30 turnable three-dimensionally with respect to the coupling linkage 26.

The end unit 30 is movable by the three arms 20 working in cooperation. For example, the three base linkages 22 turn to the upper side simultaneously to raise the end unit 30 and turn to the lower side simultaneously to lower the end unit 30. One base linkage 22 turns to the upper side and another base linkage 22 turns to the lower side, so that the end unit 30 moves toward the base linkage 22 that has turned to the upper side.

Figure 7:
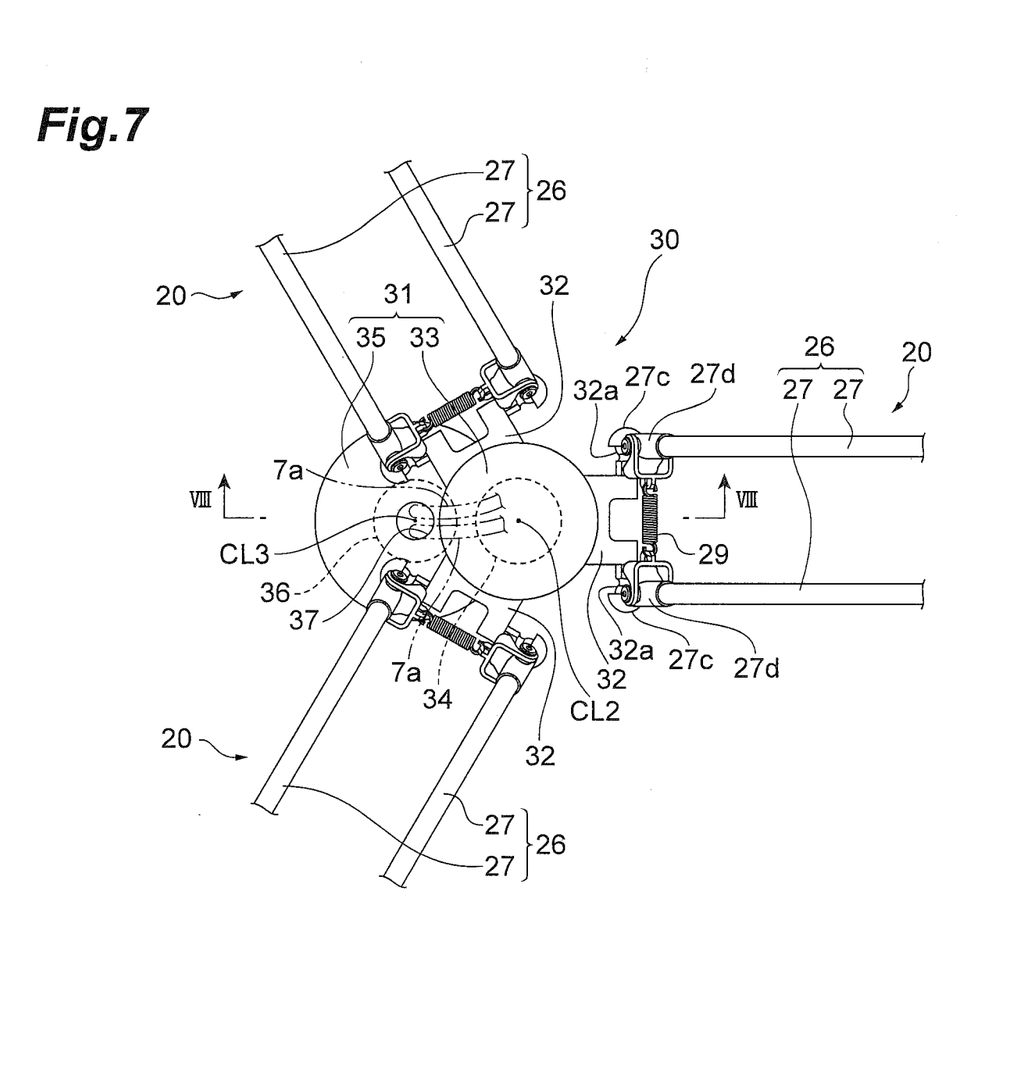
FIG. 7 is a plan view of an end unit.
Figure 8:
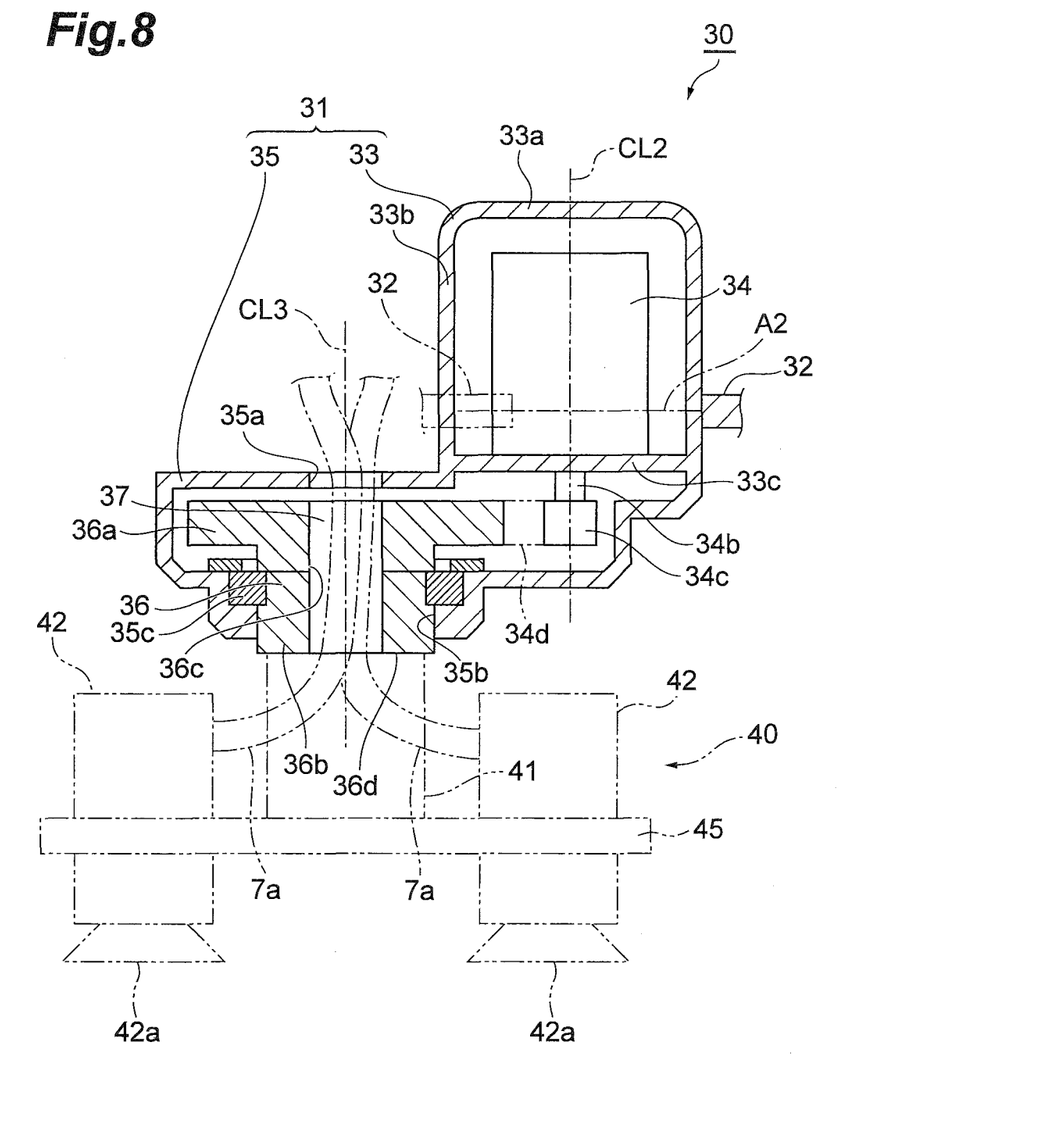
FIG. 8 is a sectional view taken along line VIII-VIII in FIG. 7.

As illustrated in FIGS. 7 and 8, the end unit 30 is covered with a housing 31. The end unit 30 includes a base 33, which couples the three arms 20, and an expansion 35, which is positioned below the base 33 and shifted laterally with respect to the base 33. The end effector 40 is mounted on the expansion 35 rotatably.

The base 33 includes a circular top plate 33a, a cylindrical side wall 33b, a dividing plate 33c parallel to the top plate 33a, and an actuator 34 accommodated in these components set forth. Three couplers 32 described above are provided on an outer periphery of the side wall 33b in the circumferential direction to surround the base 33. The pair of spherical projections 32a protrude from each coupler 32 at its both sides in the circumferential direction of the side wall 33b.

The actuator 34 is secured on the dividing plate 33c and connected through a cable 34a to the controller 5. The actuator 34 is controlled by the controller 5. The actuator 34 is configured with, for example, a motor, a speed reducer, and a sensor, and includes an output shaft 34b. The output shaft 34b, which is oriented downward along a central axis CL2 of the side wall 33b, has been inserted in the dividing plate 33c. A distal end of the output shaft 34b is positioned in the expansion 35, and a pinion pulley 34c is provided on the distal end. The cable 34a is routed along the arm 20 (see FIG. 2).

The expansion 35 is circular in a plan view and its central axis CL3 is parallel with the central axis CL2 of the side wall 33b of the base 33. The central axis CL3 is positioned outside an area A2 surrounded by the three couplers 32 in the base 33 and orthogonal to a plane including the area A2. The central axis CL3 is also positioned outside the side wall 33b and between two neighboring couplers 32. The distance between the central axis CL3 and the central axis CL2 is determined in consideration of the shape of the area A2, the size of the hose 7a, and the like.

The expansion 35 includes a rotation member 36. As illustrated in FIG. 8, the end effector 40 is secured to the rotation member 36 at its lower side. In other words, the rotation member 36 constitutes a retainer that retains the end effector 40. The rotation member 36 rotates about the central axis CL3 with the actuator 34 as a driving source. In other words, the rotation member 36 rotates about the rotation axis CL3 positioned outside the area A2 surrounded by the plurality of couplers 32. The expansion 35 has an upper opening 35a and a lower opening 35b. The upper opening 35a and the lower opening 35b are formed where the rotation member 36 is accommodated.

The rotation member 36 has a cylindrical shape and includes at its one end a flange-like pulley 36a. The rotation member 36 has at its center a through hole 36c extending in an axial direction. The through hole 36c and the upper opening 35a and the lower opening 35b of the expansion 35 form a communication hole 37 for allowing at least one of the piping and the wiring to continue. The communication hole 37 extends along the central axis CL3 and penetrates the expansion 35 including the rotation member 36 in a vertical direction. The inner diameter of the communication hole 37 is determined in consideration of the size, the the number, and the like of hoses and/or cables for the piping and/or the wiring to be routed.

The rotation member 36, which is accommodated in the expansion 35 with the pulley 36a facing upward, is attached rotatably through a bearing 35c to a periphery of the lower opening 35b. The lower end 36b of the rotation member 36 has been inserted in the lower opening 35b. A timing belt 34d is applied over the pulley 36a and the pinion pulley 34c. The actuator 34 rotates the rotation member 36 through the timing belt 34d in response to a command from the controller 5. Arrangement of both the actuator 34 and the rotation member 36 in the end unit 30 simplifies a mechanism to transmit power from the actuator 34 to the rotation member 36. As the mechanism to transmit the power from the actuator 34 to the rotation member 36, a mechanism with a gear in place of the timing belt 34d may be employed.

The end effector 40 moves together with the end unit 30 and turns together with the rotation member 36. The end effector 40, which is of a type that retains the workpiece W by suction, includes a pillar 41 secured to the rotation member 36, two adherence units 42, and a flange 45 to which the adherence units 42 are secured. The pillar 41 is attached to the rotation member 36 at a lower end surface 36d with a bolt or the like (not shown). The flange 45 is provided on an outer periphery of the pillar 41, and the two adherence units 42 are arranged so that the pillar 41 is interposed therebetween. Note that the number of adherence units 42 may be one, three or more.

An adherence unit 42 includes an adherence port 42a that opens downward. The adherence unit 42 is connected through the hose 7a to the suction blower 7. A valve (not shown) is provided at a midpoint of the hose 7a, and opening and closing of the valve is controlled by the controller 5. The valve switches between an ON state and an OFF state in response to a command from the controller 5, with the ON state being a state in which the adherence unit 42 communicates with the suction blower 7 and an OFF state being a state in which the adherence unit 42 does not communicate with the suction blower 7. In the ON state, the adherence port 42a adheres to the workpiece W by the suction force from the suction blower 7. In the OFF state, the adherence port 42a loses the suction force and releases the workpiece W. The transfer system 100 allows the valve to switch to the ON state so that the end effector 40 adheres to the workpiece W. While adhering to the workpiece W, the end effector 40 is moved to a target position. The valve is then allowed to switch to the OFF state to release the workpiece W. This operation is performed repeatedly. Through this, work, such as alignment and packing of the workpiece W, is performed.

As illustrated in FIG. 2, the hose 7a, which extends from the suction blower 7 positioned in the external space S2, is routed through the communication hole H1 into the work space S1. The hose 7a, which passes through the communication hole H1, naturally passes through the openings 11c and 11d. The hose 7a, which is routed into the work space S1, is routed through a space surrounded by the three arms 20 toward the end unit 30, and then through the communication hole 37 of the end unit 30 to the end effector 40 to be connected to the adherence unit 42.

As described above, the parallel robot 1 allows piping to be routed from the base casing 11 through the opening (the communication hole) 11c in the bottom of the base casing 11 toward the end unit 30. For the parallel robot 1, an obstacle to motion of the arms 20 cannot be arranged between the base casing 11 and the end unit 30. Thus, no structure that constitutes an obstacle to the piping is present between the opening 11c, which faces the end unit 30, and the end unit 30. Hence, the piping can be routed toward the end unit 30 with ease by using a route from the opening 11c toward the end unit 30.

Close attention is demanded for routing the piping toward the end unit 30 so as not to let the hose 7a caught by a surrounding structure while the end unit 30 moves. With the opening 11c positioned in the area surrounded by the three arms 20, the hose 7a is surrounded by the three arms 20 at least in proximity to the base casing 11. Because of this, it is less likely that the hose 7a is caught by a structure around the parallel robot 1, and thus the piping can be routed toward the end unit 30 with greater ease.

The parallel robot 1 especially allows the hose 7a to be arranged in the space surrounded by the three arms 20 also in proximity to the end unit 30 because the hose 7a is also routed through the communication hole 37, which is positioned in proximity to the lower ends of the arms 20. Thus, the piping can be routed toward the end unit 30 with greater ease.

Additionally, the opening (the communication hole) 11d, which is formed in the base casing 11 at its side opposite to the end unit 30, allows the piping to be routed through the base casing 11. Thus, the piping can be routed from the suction blower 7, which is positioned in the external space S2, toward the end unit 30, which is positioned in the work space S1, without performing the drilling into the ceiling board 3 or the side wall 6.

The communication hole H1, which penetrates the base casing 11 from its side facing the end unit 30 to its side opposite to the end unit 30, functions as a guide. Hence, the piping and/or the wiring that continues from the side facing the end unit 30 to the side opposite to the end unit 30 can be routed with greater ease. Additionally, a peripheral wall of the communication hole H1 divides a route R1 for the piping and/or the wiring from an accommodation spaces for the actuators 12, and thus improved protection can be provided for the actuators 12.

The communication hole H1 is constituted by the tubular unit P1, which is provided in the base casing 11 and allows the side facing the end unit 30 and the side opposite to the end unit 30 to communicate with each other. Through use of this configuration, the communication hole H1 can be formed with a tubular member of a simple shape with ease.

The tubular unit P1 is positioned in the area surrounded by the three actuators 12. Thus, the communication hole H1 can be formed by using effectively the space surrounded by the actuators 12. The motor 13 and the speed reducer 14 of the actuator 12 especially are arranged one above the other. This reduces the area occupied by the actuator 12 in the horizontal direction. This also contributes to the allocation of space for the communication hole H1.

The end unit 30 includes the actuator 34 for rotating the end effector 40. With the actuator for rotating the end effector 40 not arranged at the base casing 11, there is no need to place a rotation transmission shaft between the base casing 11 and the end unit 30. Thus, the piping and/or the wiring can be routed toward the end unit 30 with greater ease.

An assembly method for the transfer system 100 will now be described. The parallel robot 1 is arranged under the ceiling board 3 and the robot body 10 is attached to the ceiling board 3. In other words, the parallel robot 1 is installed. Then, the controller 5 and the suction blower 7 are installed on the ceiling board 3 at its upper side. Then, the controller 5 and the robot body 10 are connected with each other with a cable 5a. Then, the hose 7a is routed through communication hole H1 toward the end unit 30. Then, the end effector 40 is attached to the end unit 30. Then, the hose 7a is routed through the communication hole 37 to the end effector 40 to be connected to the adherence unit 42. Such a work procedure can be changed as appropriate.

Although an embodiment has been described, the invention is not limited thereto, and various changes are possible without departing from the spirit of the invention. With at least the opening 11c formed, the route from the opening 11c toward the end unit 30 can be used for routing the piping and/or the wiring, yielding the effect of facilitating the routing of the piping and/or the wiring. Thus, the communication hole H1, the opening 11d, and the communication hole 37 may be excluded. The opening 11c does not have to be positioned in the area surrounded by the three arms 20. The suction blower 7 does not have to be provided on the ceiling board 3 at its upper side, and it may be, for example, provided in the base casing 11. The hose 7a may be connected to a pipe disposed in a plant as a shared system for transmitting suction force, in place of the suction blower 7, which is special to the parallel robot 1.

The end effector 40 may be a robot hand to grip the workpiece W. An example of the robot hand includes a robot hand driven by air pressure and a robot hand driven by an electric actuator. An air-supply hose is routed through the communication hole H1 in the case of the air pressure needed as driving source, and a power-supply cable is routed through the communication hole H1 in the case of electric power needed as driving source. An effect similar to that of the routing of the hose 7a is yielded for the routing of the air-supply hose or the routing of the power-supply cable.

The communication hole H1 can be also used to route a cable for sending and receiving control signals to and from the end effector 40, and the communication hole H1 can be used to route the cable 34a to be connected to the actuator 34. In any of the cases, an effect similar to that of the routing of the hose 7a is yielded.

Indeed, the novel devices and methods described herein may be embodied in a variety of other forms; furthermore, various omissions, substitutions and changes in the form of the devices and methods described herein may be made without departing from the spirit of the inventions. The accompanying claims and their equivalents are intended to cover such forms or modification as would fall within the scope and spirit of the inventions.

Certain aspects, advantages, and novel features of the embodiment have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

What is claimed is:

1. A parallel robot, comprising:
   a base casing having a space accommodating a plurality of actuators;
   a plurality of arms, each of the plurality of arms being coupled to one of the plurality of actuators;
   an end unit coupled to the plurality of arms, the base casing having a first side facing the end unit, a second side opposite to the first side, a first opening disposed at the first side, a second opening disposed at the second side, each of the first and second openings providing communication between a communication hole and an outside of the parallel robot, and the communication hole penetrating the base casing between the first side and the second side; and
   a tubular unit provided in the base casing so as to connect the first opening and the second opening, the tubular unit including an inner circumferential surface and an outer circumferential surface, the communication hole being formed within the inner circumferential surface, an entirety of the tubular unit extending from the first opening to the second opening.

2. The parallel robot according to claim 1, wherein the communication hole is positioned in an area surrounded by the plurality of arms.

3. The parallel robot according to claim 1, wherein the tubular unit is positioned in an area surrounded by the plurality of actuators.

4. The parallel robot according to claim 1, wherein the end unit includes a retainer configured to retain an end effector and an actuator configured to drive the retainer for rotation.

5. A robot system, comprising:
   a parallel robot comprising:
      a base casing having a space accommodating a plurality of actuators;
      a plurality of arms, each of the plurality of arms being coupled to one of the plurality of actuators;
      an end unit coupled to the plurality of arms, the base casing having a first side facing the end unit, a second side opposite to the first side, a first opening disposed at the first side, a second opening disposed at the second side, each of the first and second openings providing communication between the communication hole and an outside of the parallel robot, and the communication hole penetrating the base casing between the first side and the second side;

a tubular unit provided in the base casing so as to connect the first opening and the second opening, the tubular unit including an inner circumferential surface and an outer circumferential surface, the communication hole being formed within the inner circumferential surface, an entirety of the tubular unit extending from the first opening to the second opening; and an end effector provided on the end unit of the parallel robot, at least one of a hose and a cable coupling to the end effector through the communication hole for driving the end effector.

6. The robot system according to claim 5, wherein the at least one of the hose and the cable is coupled to the end effector through a space surrounded by the plurality of arms.

7. The robot system according to claim 5, further comprising:

an installation member configured to retain the base casing of the parallel robot in such a manner that the end unit is positioned downward; and an external device installed on the installation member at an upper side thereof and coupled to the at least one of the hose and the cable.

8. The robot system according to claim 6, further comprising:

an installation member configured to retain the base casing of the parallel robot in such a manner that the end unit is positioned downward; and an external device installed on the installation member at an upper side thereof and coupled to at the least one of the hose and the cable.

9. The robot system according to claim 7, further comprising:

a division member configured to divide vertically surroundings of the base casing of the parallel robot;

a workpiece transfer device arranged below the parallel robot; and a side wall installed around the workpiece transfer device, wherein the division member and the side wall divide a work space of the parallel robot from an external space.

10. The robot system according to claim 8, further comprising:

a division member configured to divide vertically surroundings of the base casing of the parallel robot;

a workpiece transfer device arranged below the parallel robot; and a side wall installed around the workpiece transfer device, wherein the division member and the side wall divide a work space of the parallel robot from an external space.

11. An assembly method for a transfer system, the method comprising:

installing a parallel robot, the parallel robot including a base casing having a space accommodating a plurality of actuators, a plurality of arms, each of the plurality of arms being coupled to one of the plurality of actuators, and an end unit coupled to the plurality of arms, the base casing having a first side facing the end unit, a second side opposite to the first side, a communication hole penetrating the base casing between the first side and the second side, a first opening disposed at the first side, a second opening disposed at the second side, each of the first and second openings providing communication between the communication hole and an outside of the parallel robot, and a tubular unit provided in the base casing so as to connect the first opening and the second opening, the tubular unit including an inner circumferential surface and an outer circumferential surface, the communication hole being formed within the inner circumferential surface; an entirety of the tubular unit extending from the first opening to the second opening;

routing at least one of a hose and a cable through the communication hole;

attaching an end effector to the end unit; and coupling the at least one of the hose and the cable to the end effector.

12. The parallel robot according to claim 1, wherein the base casing includes a lid and a bottom portion, the lid being separated from the bottom portion in a vertical direction and the tubular unit extends from the lid to the bottom portion of the base casing.

13. The parallel robot according to claim 12, wherein the base casing includes an inner space, the tubular unit dividing the inner space into a first space inside the tubular unit and a second space outside of the tubular unit such that the first space is defined by the inner circumferential surface of the tubular unit and the second space is defined by the lid, the bottom portion of the base casing, and the outer circumferential surface of the tubular unit.

14. The parallel robot according to claim 1,
wherein at least one of piping and wiring extends through the communication hole, and
wherein the tubular unit separates the communication hole from the space accommodating the plurality of actuators.

15. The robot system according to claim 5,
wherein the at least one of the hose and the cable extends through the communication hole, and
wherein the tubular unit separates the communication hole from the space accommodating the plurality of actuators.

16. The method according to claim 11,
wherein the at least one of the hose and the cable extends through the communication hole, and
wherein the tubular unit separates the communication hole from the space accommodating the plurality of actuators.

17. The parallel robot according to claim 14, wherein the piping or wiring extends within the inner circumferential surface of the tubular unit toward an end effector to provide suction, air pressure, electric power, or control signals to the end effector.

18. The parallel robot according to claim 1, wherein the tubular unit extends an entire length of the casing from the first side to the second side so as to form a continuous path from the outside of the parallel robot at a top of the base casing to the outside of parallel robot at a bottom of the base casing.

19. The parallel robot according to claim 14, wherein the piping and the wiring extend through the communication hole.

* * * * *